(12) United States Patent
Kato et al.

(10) Patent No.: US 10,036,479 B2
(45) Date of Patent: Jul. 31, 2018

(54) ALLOY FOR A FUSIBLE PLUG AND A FUSIBLE PLUG

(75) Inventors: Rikiya Kato, Soka (JP); Tetsuro Kikuchi, Iwate (JP); Mutsumi Deguchi, Yachiyo (JP); Yasuaki Koiwa, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 11/918,255

(22) PCT Filed: Apr. 14, 2005

(86) PCT No.: PCT/JP2005/007214
§ 371 (c)(1),
(2), (4) Date: Dec. 18, 2008

(87) PCT Pub. No.: WO2006/112015
PCT Pub. Date: Oct. 26, 2006

(65) Prior Publication Data
US 2009/0148338 A1   Jun. 11, 2009

(51) Int. Cl.
*C22C 28/00*   (2006.01)
*F16K 17/38*   (2006.01)

(52) U.S. Cl.
CPC ............ *F16K 17/383* (2013.01); *C22C 28/00* (2013.01); *F25B 2400/162* (2013.01); *F28F 2265/12* (2013.01)

(58) Field of Classification Search
CPC ... F16K 17/383; C22C 28/00; F25B 2400/162
USPC ........................ 420/555; 439/366, 620.3, 890
See application file for complete search history.

(56) References Cited

U.S. PATENT DOCUMENTS

2006/0067852 A1* 3/2006 Suh .................. C22C 12/00
420/555

FOREIGN PATENT DOCUMENTS

| JP | 2001214985 | | 8/2001 | |
| JP | 2002-115940 A | * | 4/2002 | |
| JP | 2002115940 | | 4/2002 | |
| JP | 2002310543 | | 10/2002 | |
| JP | 2003013165 | * | 1/2003 | ............. C22C 28/00 |
| JP | 2003-130240 | * | 5/2003 | |
| JP | 2003-130240 A | * | 5/2003 | |
| JP | 2003130240 | | 5/2003 | |
| JP | 2005-063792 | * | 3/2005 | |
| JP | 2005063792 | | 3/2005 | |

OTHER PUBLICATIONS

Hara et al., JP 2003-013165, pub. Jan. 2003. (machine translation).*

* cited by examiner

*Primary Examiner* — Keith Walker
*Assistant Examiner* — John A Hevey
(74) *Attorney, Agent, or Firm* — Cermak Nakajima & McGowan LLP; Tomoko Nakajima

(57) ABSTRACT

A fusible plug employs an alloy which comprises 5-8 mass % of Sn, 31-34 mass % of Bi, 0.2-4 mass % of Sb, and a remainder of In. The alloy melts at approximately 66-70° C. The alloy may further contain at most 2.0 mass % of at least one element selected from strengthening elements consisting of 0.1-1.0 mass % of Cu, 0.1-1.0 mass % of Ge, 0.1-0.7 mass % of Ag, 0.1-0.6 mass % of Au, 0.2-0.6 mass % of Zn, 0.002-0.1 mass % of Ni, and 0.01-0.1 mass % of a lanthanoid.

14 Claims, 2 Drawing Sheets

Operating temperature vs Sn content

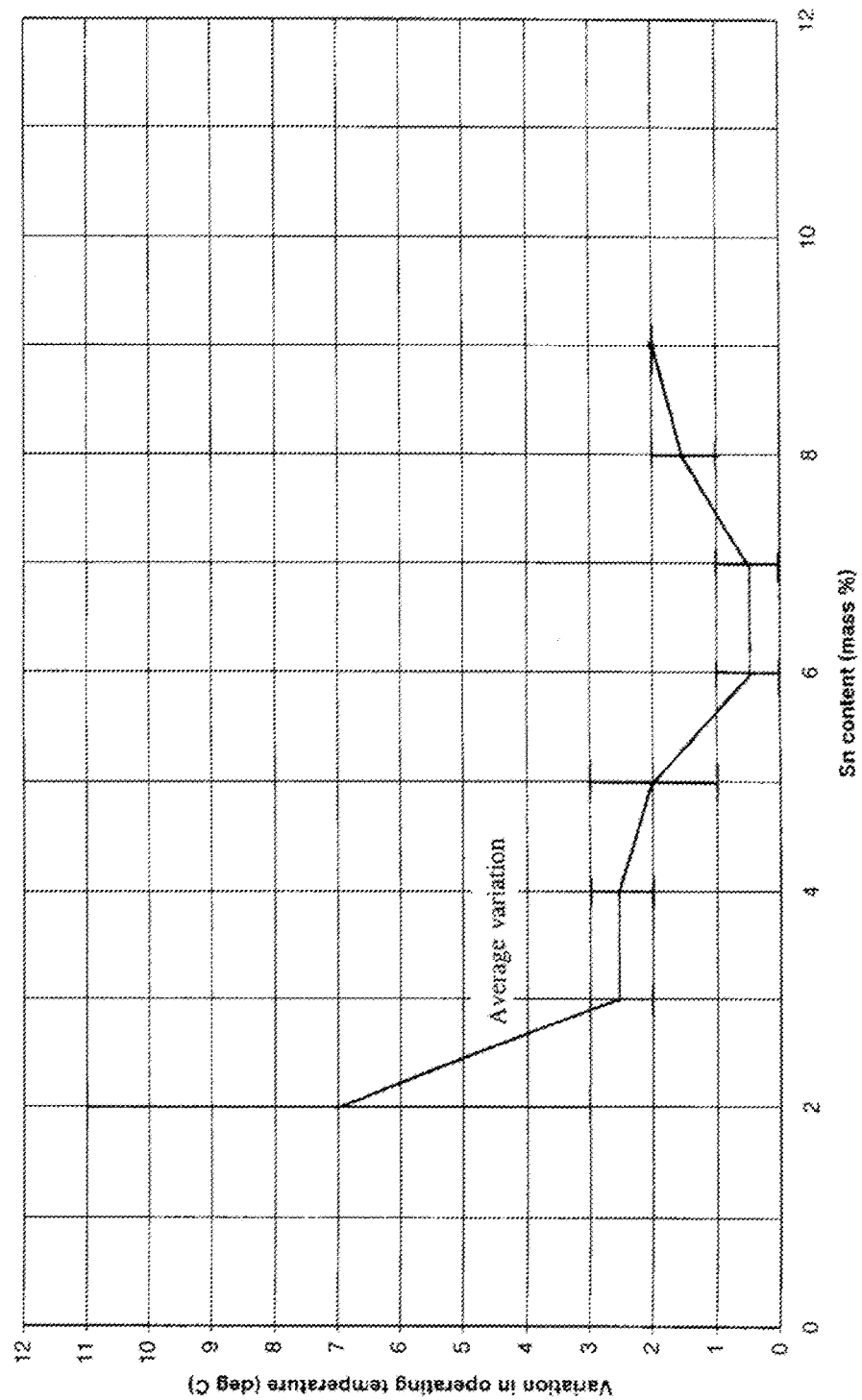

ALLOY FOR A FUSIBLE PLUG AND A FUSIBLE PLUG

TECHNICAL FIELD

This invention relates to an alloy for a fusible plug which functions as a protective device for refrigeration equipment and particularly an alloy for a fusible plug which operates at 66-70° C. and a fusible plug which uses this alloy for a fusible plug.

BACKGROUND ART

With large-sized refrigeration equipment, if the pressure inside the refrigeration equipment abnormally increases or the temperature of refrigerant increases, the refrigeration equipment itself may be damaged, and high pressure gas may spew out and damage the surroundings. As a mechanism for preventing damage and breakage of refrigerators, large-sized refrigeration equipment is required to have a safety device for controlling the pressure of refrigerant gas in the refrigeration equipment (Rule 7-1-8 of Refrigeration Safety Regulations of the Ministry of Economy, Trade, and Industry of Japan). Such equipment is typically equipped with a safety device such as a fusible plug. Safety devices for refrigeration equipment and their operation are individually designed by each manufacturer in accordance with the refrigerant being used. In the past, CFC (chlorofluorocarbon) refrigerants were the most widely used refrigerants in refrigeration equipment. However, CFC refrigerants have the problem that they can undergo photolysis by the action of ultraviolet light in sunlight in the stratosphere to form active chlorine, which destroys the ozone layer. Therefore, strict restrictions on the use of these refrigerants have been developed on a global level. Accordingly, they are now being replaced by HCFC (hydrochlorofluorocarbon) refrigerants, which are substitutes for CFC refrigerants. HFC (hydrofluorocarbon) refrigerants which have a still smaller ozone-depleting potential have also been developed. Thus, different types of refrigerants are being used in refrigeration equipment.

Fusible plugs used in refrigeration equipment need to be designed based on the refrigerant which is used. When the pressure of refrigerant used in refrigeration equipment increases, the temperature of the refrigerant increases in accordance with Boyle-Charles' law. Therefore, the operating temperature of a fusible plug being used is determined in accordance with the condensation pressure of the refrigerant being used. For example, in the case of refrigerating equipment for air conditioning which employs R22 (HCFC 22) (which is the HCFC refrigerant which currently is most in demand) as a refrigerant for refrigeration equipment, the condensation pressure is 1.94 MPa, and the critical temperature of R22 is 96.2° C. Therefore, the operating temperature of a fusible plug is designed to be approximately 95-100° C.

The critical temperature varies with the refrigerant being used. When the refrigerant is changed, it is necessary to redesign the operating temperature of a fusible plug. When using R404A, which is a HFC refrigerant used as a substitute refrigerant having a small ozone-depleting potential, it has a condensation pressure of 3061 KPa, and its critical temperature is 71.6° C. Therefore, a fusible plug having a design temperature of approximately 66-70° C. should be used.

Fusible plugs for refrigeration equipment use low melting point solder alloys, and the solder alloys which have been used are those containing Pb or Cd which is harmful. When R22 is used as a refrigerant, since the design temperature of a fusible plug is 96° C., a Sn-52Bi-32Pb alloy (eutectic at 96° C.) has been used. When R410a is used as a refrigerant, the design temperature of a fusible plug becomes 71-75° C., and a solder alloy such as Sn-50Bi-10Cd-26.7Pb (solidus temperature of 69° C., peak temperature of 76° C., liquidus temperature of 81° C.) has been used.

In general, fusible plugs are recovered together with refrigeration equipment. When refrigeration equipment is discarded, it is of course necessary to treat the equipment in accordance with laws and regulations. Particularly in recent years, active efforts are being made to protect the global environment, and there is a tendency to exclude harmful elements from parts used in equipment such as refrigeration equipment. In particular, as Cd and Pb have a harmful effect on the human body, they have become the subject of regulations.

Known alloys for fusible plugs which do not contain harmful elements such as Cd and Pb include alloys of two or more elements selected from Sn, Bi, In, Zn, and Ga (JP 2002-115940 A1), low melting point alloys for fusible plugs of a tin-indium-bismuth alloy wherein when the composition is Sn: X wt %, In: Y wt %, and Bi: Z wt %, then X+Y+Z=100 and $4 \leq X \leq 10$ and $56 \leq Y \leq 63$ (JP2001-214985 A1), and fusible alloys of bismuth, indium, and tin containing fine metal particles added thereto (JP 2003-130240 A1).

Patent Document 1: JP 2002-115940 A1
Patent Document 2: JP 2001-214985 A1
Patent Document 3: JP 2003-130240 A1

DISCLOSURE OF INVENTION

In the past, fusible plugs used as safety devices in refrigeration equipment have used solder alloys containing Pb or Cd which is a harmful element. However, in recent years, there has been active movement towards protecting the global environment, and there is a trend of excluding harmful elements from parts used in equipment such as refrigeration equipment. In particular, Cd and Pb have a harmful effect on the human body, so they have become the subject of regulation. Above-described Patent Document 1 discloses a tin (Sn)-indium (In)-bismuth (Bi) alloy as an alloy for fusible plugs which does not contain harmful elements such as Cd and Pb, but this alloy for a fusible plug has poor creep properties in a low temperature range. Therefore, during use as a safety device in refrigeration equipment, the alloy is sometimes forced out by pressure over time, and after a certain period elapsed, it is necessary to stop the refrigeration equipment and replace the fusible plug.

A fusible alloy comprising bismuth, indium, and tin and containing fine metal particles added thereto as disclosed in Patent Document 3 has the drawback that creep properties tends to worsen over time, since the fine metal particles which have initially been uniformly dispersed in the alloy composition gradually become unevenly distributed while the alloy undergoes a high temperature and high pressure for a long period.

Although it is not an alloy for a fusible plug for refrigeration equipment, an alloy for a thermal fuse containing at least 34 wt % to at most 63 wt % of bismuth, at least 1 wt % to at most 24 wt % of tin, and a remainder of indium has been disclosed (JP 2003-13165 A1). Since a thermal fuse is used as a load against abnormal high temperatures in electronic equipment, it is sufficient for it to cut off electricity in accordance with the temperature, and pressure is not applied to it during use. Therefore, the mechanical strength such as creep properties of the alloy is not taken into consideration, so it cannot be used without modification as an alloy for a fusible plug.

The present invention provides an alloy for a fusible plug which does not contain the harmful elements Cd and Pb and which has a strong mechanical strength such as creep properties such that the alloy is not pressed out of the fusible plug even when the plug is used for long periods as a safety device for refrigeration equipment.

As a result of diligent investigations concerning the defects of conventional alloys having a solidus temperature and a peak temperature in the range of 65-75° C., the present inventors discovered that among Bi—In—Sn based alloys, alloys in a limited range of compositions have a solidus temperature and a peak temperature in the very narrow temperature range of approximately 66-70° C. and hence are suitable as alloys for fusible plugs, and they thereby completed the present invention. Moreover, these alloys do not contain any of the harmful components Cd and Pb.

An alloy according to the present invention which melts at a temperature of approximately 66-70° C. is an alloy for a fusible plug characterized by comprising 5-8 mass % of Sn, 31-34 mass % of Bi, 0.2-4 mass % of Sb, and a remainder of In.

An alloy for a fusible plug according to the present invention contains none of the harmful components Cd and Pb, and the alloy is not forced out from a fusible plug during use. Therefore, it makes it possible to use a fusible plug as a safety device for refrigeration equipment for long periods without replacement.

BRIEF EXPLANATION OF THE DRAWINGS

FIG. 2 is a photograph of fusible plugs which underwent protrusion by pressure after a pressure test.

Figure 1:
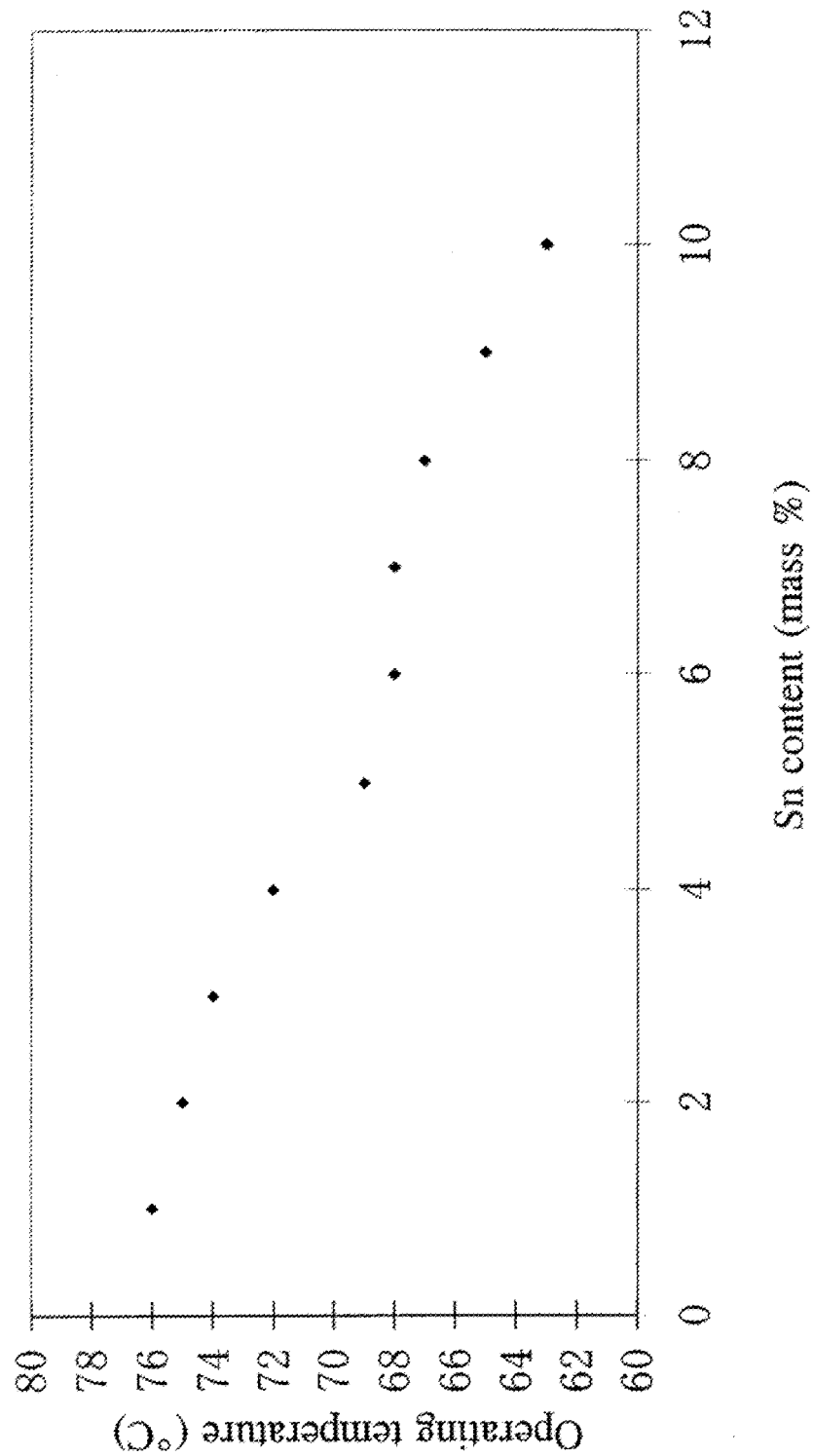
FIG. 1 is a cross-sectional view of a fusible plug.

LIST OF REFERENCE NUMERALS 1 blank; 2 alloy for a fusible plug; 3 thread

BEST MODE FOR CARRYING OUT THE INVENTION

The operation of a fusible plug depends on the melting temperature of an alloy for the fusible plug. Pressure is always applied to the plug by the refrigeration equipment. Therefore, if the mechanical strength such as the creep properties (creep strength) of the plug is low, the plug cannot function as a safety device.

With a Bi—In—Sb—Sn based alloy according to the present invention which has a solidus and peak temperature in the range of approximately 66-70° C., if the Sn content is less than 5 mass %, the mechanical strength of the alloy itself is low, and the amount by which the alloy protrudes in a pressure test exceeds a prescribed amount. On the other hand, if the Sn content is larger than 8 mass %, the solidus temperature of the Bi—In—Sb—Sn based alloy decreases and the melting temperature of the alloy approaches the temperature region of use, resulting in deterioration of the strength of the alloy, and creep properties deteriorate in the operating temperature range. Therefore, in a Bi—In—Sb—Sn based alloy according to the present invention, the Sn content is defined as 5-8 mass %. If the Bi content is less than 31 mass %, the liquidus temperature of a Bi—In—Sb—Sn based alloy increases too much, the melting properties of the alloy become poor, and it can no longer pass a melting test. On the other hand, if the Bi content becomes larger than 34 mass %, the alloy composition significantly deviates from the eutectic point of a Sn—In alloy, and the liquidus temperature rises too much. As a result, the melting properties of the alloy worsen, and the alloy can no longer pass a melting test. In an alloy according to the present invention having a solidus and peak temperature in the range of approximately 66-70° C., Sb is further added to a Bi—In—Sn based alloy. This is because in refrigeration equipment using an alloy having a solidus and peak temperature in the range of approximately 66-70° C., a refrigerant such as R404A having a high condensation pressure is employed, and thus an alloy having a stronger resistance to pressure is desired. By adding Sb in the present invention, it is possible to maintain sufficient pressure resistance with respect to R404A, which is a refrigerant having a high condensation pressure. If the Sb content of a Bi—In—Sb—Sn based alloy according to the present invention is less than 0.2 mass %, the mechanical strength of the alloy itself is low, thereby causing the occurrence of the defect that the amount by which the alloy protrudes in a pressure test exceeds a prescribed amount. On the other hand, if the Sb content is larger than 4 mass %, the solidus temperature of the Bi—In—Sb—Sn based alloy decreases, and the melting temperature of the alloy approaches the temperature region of use. As a result, the strength of the alloy deteriorates, and the creep properties deteriorate in the operating temperature range. Therefore, the Sb content is defined as 0.2-4 mass % in a Bi—In—Sb—Sn based alloy according to the present invention. In the present invention, by employing a composition comprising 5-8 mass % of Sn, 31-34 mass % of Bi, 0.2-4 mass % of Sb, and a remainder of In, it is possible to obtain an alloy for a fusible plug having a strong creep strength with a temperature range of use of 66-70° C. Preferably, by employing an alloy composition comprising 5 mass % of Sn, 33 mass % of Bi, 2 mass % of Sb, and a remainder of In, it is possible to obtain an alloy for a fusible plug having a narrower operating temperature range and a higher creep strength. When the contents of Sn, Bi, and Sb which are the basic components of an alloy for a fusible plug according to the present invention deviate from their above-described respective ranges of composition, the melting temperature range broadens and operating stability is worsened.

A strengthening element may be added to a Bi—In—Sb—Sn based alloy according to the present invention. Examples of strengthening elements are Cu, Ge, Ag, Au, Zn, Ni, and members of the lanthanoid series. Members of the lanthanoid series, which are referred to as lanthanoids, are La as well as Ce, Pr, Nd, Pm, Eu, Tb, Dy, Ho, Er, Tm, Yb, and Lu which have properties resembling those of La. These strengthening elements have an effect when added alone or when added in combination. Among strengthening elements, the addition of Cu most improves creep properties in a Bi—In—Sb—Sn based alloy according to the present invention. However, in contrast to the invention of above-described Patent Document 3, these strengthening elements are always dissolved in a Bi—In—Sb—Sn based alloy. Therefore, if the added amount is too large, the melting temperature of the alloy increases. For this reason, the total amount of strengthening elements is preferably restricted to at most 2.0 mass %. Most preferably, the added amount of each strengthening element is 0.1-1.0 mass % for Cu, 0.1-1.0 mass % for Ge, 0.1-0.7 mass % for Ag, 0.1-0.6 mass % for Au, 0.2-0.6 mass % for Zn, 0.02-0.1 mass % for Ni, and 0.01-0.1 mass % for lanthanoids. If the amounts are smaller than these values, the effect of increasing the strength of the alloy is not obtained, and if a larger amount is added, the liquidus temperature of the alloy ends up increasing, and operation can no longer take place in the desired temperature range.

A fusible plug according to the present invention is formed by melting a Bi—In—Sb—Sn based alloy and sealing the molten alloy in a blank. Depending upon the shape of a blank, fusible plugs include the single thread type, double thread type, flared pipe type, multiple bore type, and the like, and a fusible plug according to the present invention can be applied to any of these types.

Example 1

Alloys for a fusible plug and fusible plugs according to the present invention were prepared and their properties were compared.

The alloys for a fusible plug having compositions shown in Table 1 were prepared. The heating curve of each alloy composition was measured by differential thermal analysis, and the solidus temperature, the peak temperature, and the liquidus temperature of the alloy composition were determined by the starting point of the endothermic peak during melting, the lowest point of the endothermic peak, and the final point of the endothermic peak, respectively. These melting temperatures of each alloy are shown in Table 1.

Comparative Examples 3 and 5 in Table 1 were alloys for fusible plugs of Patent Document 2.

The conditions for measuring the melting temperatures were as follows.

1. Measurement by Differential Thermal Analysis
Differential thermal analyzer: differential scanning calorimeter made by SII.
Rate of temperature increase: 5 degrees per minute
Weight of sample: 10 mg length of 28 mm and an inner diameter of 3 mm at its tip portion was used for the pressure test and the operating test.

2. Pressure Test

1) A fusible plug was placed inside a thermostatic chamber set to 65° C. for a Bi—In—Sb—Sn based alloy according to the present invention, the plug was connected to a compressor, and a pressure of 12.5 MPa was applied to the plug.

2) After 24 hours, the fusible plug was removed from the thermostatic chamber and disconnected from the compressor.

3) After the plug was allowed to stand for 24 hours, the length by which the fusible alloy used for filling the blank protruded from the blank was measured.

4) Tables 1 show the lengths by which alloys extended during the pressure test, and FIG. 2 shows a typical photograph when the alloy compositions of an example and comparative example in Table 1 were measured in the test at 65° C. In the photograph, 1 shows the results for the fusible plug of Example 4, and 2 shows the results for the fusible plug of Comparative Example 5.

3. Operating Test

1) A fusible plug was connected to a compressor, and a pressure of 3 MPa was applied to the plug.

2) The fusible plug connected to the compressor was placed into a water bath, and the water in the water bath was heated.

3) The temperature at which air abruptly leaked from the fusible plug in the water bath was measured as the operating temperature.

In the photograph of FIG. 2, fusible plug 2 which was a comparative example of a fusible plug had a solidus temperature which was lower than that of the fusible plug of the example, so the alloy for the fusible plug came out of the

TABLE 1

| | | Alloy composition (mass %) | | | | | | | | | | Melting temperatures (° C.) | | | Pressure test (mm) | FIG. 2 | Operating test (° C.) |
|---|---|---|---|---|---|---|---|---|---|---|---|---|---|---|---|---|---|
| | | In | Bi | Sn | Cu | Sb | Ge | Ag | Au | Zn | Ni | La | Solidus | Peak | Liquidus | | | |
| This Invention | 1 | rem. | 31 | 8 | | 1 | | | | | | | 66 | 68 | 68 | 1.2 | | 68 |
| | 2 | rem. | 31 | 5 | | 0.5 | | | | | | | 68 | 70 | 70 | 1.5 | | 69 |
| | 3 | rem. | 33 | 8 | | 1 | | | | | | | 66 | 68 | 68 | 0.8 | | 68 |
| | 4 | rem. | 33 | 5 | | 2 | | | | | | | 67 | 69 | 69 | 0.6 | 1 | 69 |
| | 5 | rem. | 34 | 5 | 0.1 | 1 | | | | | | | 68 | 70 | 70 | 0.8 | | 70 |
| | 6 | rem. | 32 | 8 | 0.5 | 1 | | | | | 0.1 | | 67 | 69 | 69 | 0.7 | | 69 |
| | 7 | rem. | 33 | 7 | 1 | 1 | | | | | | | 66 | 70 | 70 | 0.6 | | 70 |
| | 8 | rem. | 32 | 8 | | 1 | 0.3 | | | | | | 67 | 70 | 70 | 0.6 | | 70 |
| | 9 | rem. | 33 | 6 | | 0.2 | | 0.5 | | | | | 67 | 69 | 69 | 0.6 | | 69 |
| | 10 | rem. | 32 | 6 | | 1 | | | 0.3 | | | | 67 | 70 | 70 | 1 | | 70 |
| | 11 | rem. | 32 | 7 | | 2 | | | | 0.2 | | | 66 | 68 | 68 | 0.8 | | 68 |
| | 12 | rem. | 32 | 7 | 0.5 | 1 | | 0.3 | | | | 0.05 | 66 | 70 | 70 | 0.7 | | 70 |
| Comp. Ex. | 1 | rem. | 35 | 10 | | | | | | | | | 61 | 64 | 69 | molten | | |
| | 2 | rem. | 29 | 8 | | | | | | | | | 65 | 67 | 75 | 2.5 | | 75 |
| | 3 | rem. | 35 | 10 | | | | | | | | | 61 | 64 | 72 | 0.8 | | 78 |
| | 4 | rem. | 35 | 3 | 1 | 1 | | 1 | | | | | 67 | 70 | 77 | 0.6 | | 77 |
| | 5 | rem. | 36 | 10 | | | | | 1 | | | | 60 | 63 | 145 | molten | 2 | |
| | 6 | rem. | 30 | 2 | 2 | | | | | | | | 64 | 65 | 88 | 1.7 | | 88 |

Example 2

Next, blanks 1 for fusible plugs of the single thread type shown in FIG. 1 were filled with the fusible alloys of Table 1 to prepare fusible plugs. The creep properties of each alloy composition were measured in a pressure test and the operating temperature of the fusible plug were also measured in an operating test. A fusible plug having an overall blank and protruded. In particular, fusible plug 2 which was a fusible plug of Comparative Example 5 became a half-molten body when heated at the test conditions of 65° C. In contrast, fusible plug 1, which was an example of the present invention, had only a small amount of the alloy for the fusible plug coming out of the blank, and the alloy for the fusible plug did not protruded.

A fusible plug according to the present invention operates at a temperature in the range of approximately 66-70° C., and the low temperature creep properties of the alloy for a fusible plug are good. Accordingly, even when pressure is applied for a long period at a high temperature, the alloy for a fusible plug does not come out of a blank. Therefore, when it is used as a protective device for refrigeration equipment, it provides the effect which cannot be provided by conventional fusible plugs that it can be used for long periods.

INDUSTRIAL APPLICABILITY

An alloy for a fusible plug according to the present invention can be used not only for a fusible plug used as a protective device for refrigeration equipment but can also be used as an alloy for a sprinkler which, like a fusible plug, is always subjected to pressure.

The invention claimed is:

1. A fusible plug comprising
a hollow blank having a bore and an alloy for a fusible plug sealing the bore, the alloy having an operating temperature, solidus temperature, and peak temperature in the range of 66-70° C. and consisting essentially of
6-8 mass percent of Sn,
31-33 mass percent of Bi,
0.5-2 mass percent of Sb,
Further optionally, a total of at most 4.0 mass percent of at least one alloying element selected from
strengthening elements consisting essentially of
0.1-1.0 mass percent of Cu,
0.1-1.0 mass percent of Ge,
0.1-0.7 mass percent of Ag,
0.02-0.1 mass percent of Ni,
and 0.01-0.1 mass percent of a lanthanoid;
and a remainder of In
as alloying elements.

2. A fusible plug comprising a hollow blank having a bore and an alloy for a fusible plug sealing the bore, the alloy having an operating temperature, solidus temperature, and peak temperature in the range of 66-70° C. and consisting essentially of
6-8 mass percent of Sn,
31-33 mass percent of Bi,
0.2-4 mass percent of Sb,
further optionally at least one of
0.1-1.0 mass percent of Cu,
0.1-1.0 mass percent of Ge,
0.1-0.7 mass percent of Ag,
0.1-0.6 mass percent of Au,
0.02-0.1 mass percent of Ni,
and 0.01-0.1 mass percent of a lanthanoid;
and a remainder of In
as alloying elements.

3. The fusible plug as claimed in claim 1 wherein the alloy contains 33 mass percent of Bi and 1 mass percent of Sb as alloying elements.

4. The fusible plug as claimed in claim 2 wherein the alloy contains 33 mass percent of Bi and 1 mass percent of Sb as alloying elements.

5. The fusible plug as claimed in claim 1 wherein the blank has a thread on its outer surface.

6. The fusible plug as claimed in claim 1 wherein the alloy contains 1-2 mass percent of Sb as an alloying element.

7. The fusible plug as claimed in claim 1 wherein the alloy contains 6-7 mass percent of Sn as an alloying element.

8. The fusible plug as claimed in claim 2 wherein the blank has a thread on its outer surface.

9. The fusible plug as claimed in claim 2 wherein the alloy contains 1-2 mass percent of Sb as an alloying element.

10. The fusible plug as claimed in claim 2 wherein the alloy contains 6-7 mass percent of Sn as an alloying element.

11. A fusible plug comprising
a hollow blank having a bore and an alloy for a fusible plug sealing the bore, the alloy having an operating temperature, solidus temperature, and peak temperature in the range of 66-70° C. and consisting essentially of
6-8 mass percent of Sn,
31-33 mass percent of Bi,
0.2-4 mass percent of Sb,
and a remainder of In
as alloying elements.

12. The fusible plug as claimed in claim 11, wherein the blank has a thread on its outer surface.

13. A fusible plug comprising a hollow blank having a bore and an alloy for a fusible plug sealing the bore, the alloy having an operating temperature, solidus temperature, and peak temperature in the range of 66-70° C. and consisting essentially of
6-8 mass percent of Sn,
31-33 mass percent of Bi,
0.2-4 mass percent of Sb,
further optionally at least one of
0.1-1.0 mass percent of Cu,
0.1-1.0 mass percent of Ge,
0.1-0.7 mass percent of Ag,
0.1-0.6 mass percent of Au,
0.02-0.1 mass percent of Ni, and
0.01-0.1 mass percent of a lanthanoid,
and a remainder of In
as alloying elements,
wherein no more than about 1.5 mm of the alloy is extruded from the blank after 24 hours under 12.5 MPa of pressure at 65° C.

14. A fusible plug comprising a hollow blank having a bore and an alloy for a fusible plug sealing the bore, the alloy having an operating temperature, solidus temperature, and peak temperature in the range of 66-70° C. and consisting essentially of
6-8 mass percent of Sn,
31-33 mass percent of Bi,
0.5-2 mass percent of Sb,
further optionally, a total of at most 4.0 mass percent of at least one alloying element selected from strengthening element
0.1-1.0 mass percent of Cu,
0.1-1.0 mass percent of Ge,
0.1-0.7 mass percent of Ag,
0.1-0.6 mass percent of Au,
0.02-0.1 mass percent of Ni, and
0.01-0.1 mass percent of a lanthanoid,
and a remainder of In
as alloying elements,
wherein no more than about 1.5 mm of the alloy is extruded from the blank after 24 hours under 12.5 MPa of pressure at 65° C.

* * * * *